United States Patent
Li et al.

(10) Patent No.: US 10,379,732 B2
(45) Date of Patent: Aug. 13, 2019

(54) METHOD FOR ADJUSTING SCREEN BRIGHTNESS AND USER TERMINAL

(71) Applicant: Guangdong Oppo Mobile Telecommunications Corp., Ltd., Dongguan, Guangdong (CN)

(72) Inventors: Jianlin Li, Guangdong (CN); Xingxing Tang, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 179 days.

(21) Appl. No.: 15/628,227

(22) Filed: Jun. 20, 2017

(65) Prior Publication Data

US 2017/0285907 A1    Oct. 5, 2017

Related U.S. Application Data

(63) Continuation of application No. PCT/CN2016/080576, filed on Apr. 28, 2016.

(30) Foreign Application Priority Data

Aug. 27, 2015  (CN) .......................... 2015 1 0535630

(51) Int. Cl.
  G06F 3/048    (2013.01)
  G06F 3/0488   (2013.01)
  G06F 3/041    (2006.01)
  G06F 3/0484   (2013.01)
  H04M 1/22     (2006.01)
  H04W 52/02    (2009.01)

(52) U.S. Cl.
  CPC .......... G06F 3/0488 (2013.01); G06F 3/0416 (2013.01); G06F 3/04847 (2013.01); H04M 1/22 (2013.01); H04W 52/027 (2013.01); Y02D 70/26 (2018.01)

(58) Field of Classification Search
  CPC ............. G06F 3/048; G06F 3/041; G06F 3/00
  See application file for complete search history.

(56) References Cited

U.S. PATENT DOCUMENTS

| 6,724,356 B1* | 4/2004 | Kojima ................ G09G 3/2944 345/211 |
| 2012/0242633 A1* | 9/2012 | Kim ........................ G09G 3/20 345/207 |

(Continued)

FOREIGN PATENT DOCUMENTS

| CN | 101833419 A | 9/2010 |
| CN | 102790824 A | 11/2012 |

(Continued)

*Primary Examiner* — Hugo Molina
(74) *Attorney, Agent, or Firm* — Young Basile Hanlon & MacFarlane, P.C.

(57) ABSTRACT

A method and a terminal for adjusting screen brightness include the follows. A target pressure value and a target touch duration of a touch operation performed in a touch area by a user is detected. A target brightness adjustment amount corresponding to the target touch duration is acquired according to a preset correspondence relationship between a touch duration and a brightness adjustment amount, when a preset condition is met. Screen brightness is adjusted based on the target brightness adjustment amount.

6 Claims, 7 Drawing Sheets

(56) References Cited

U.S. PATENT DOCUMENTS

| | | | | |
|---|---|---|---|---|
| 2014/0223388 A1* | 8/2014 | Kim | ...................... | G06F 3/0488 |
| | | | | 715/863 |
| 2015/0002406 A1* | 1/2015 | Small | ...................... | G06F 3/041 |
| | | | | 345/173 |
| 2015/0078586 A1* | 3/2015 | Ang | ........................ | H03G 1/00 |
| | | | | 381/109 |
| 2015/0138046 A1* | 5/2015 | Moon | .................... | G06F 3/0416 |
| | | | | 345/7 |
| 2016/0259458 A1* | 9/2016 | Johansson | ............. | G06F 3/0414 |

FOREIGN PATENT DOCUMENTS

| | | |
|---|---|---|
| CN | 103152942 A | 6/2013 |
| CN | 103778361 A | 5/2014 |
| CN | 103885675 A | 6/2014 |
| CN | 104020936 A | 9/2014 |
| CN | 104281376 A | 1/2015 |
| CN | 104536766 A | 4/2015 |
| CN | 105117060 A | 12/2015 |

\* cited by examiner

METHOD FOR ADJUSTING SCREEN BRIGHTNESS AND USER TERMINAL

CROSS-REFERENCE TO RELATED APPLICATION(S)

This application is a continuation of international application No. PCT/CN2016/080576, filed on Apr. 28, 2016, which claims priority to Chinese Patent Application No. 201510535630.3, filed on Aug. 27, 2015, the contents of both of which are incorporated by reference herein in their entireties.

TECHNICAL FIELD

The present disclosure relates to the field of communications technology, and particularly to a method for adjusting screen brightness and a user terminal.

BACKGROUND

With the development of intelligent terminals (such as smart phones, Pad and the like), the intelligent terminal has become an indispensable item in people's lives. During using of the intelligent terminal, the user often adjusts screen brightness of the intelligent terminal manually. For example, when the user reads a novel with the intelligent terminal, the user may decrease the screen brightness to avoid excessive damage to the eye; when the user watches a video, the user may increase the screen brightness to watch the video more clearly. In the related method for adjusting the screen brightness, in order to adjust the screen brightness, the user needs to enter a phone settings menu of the intelligent terminal, select a "display" option, and enter a screen brightness adjusting menu. Obviously, the operating process in the related art for adjusting the screen brightness is very complicated, and is inconvenient to the user.

BRIEF DESCRIPTION OF THE DRAWINGS

In order to illustrate the technical solutions of the implementations of the present disclosure more clearly, the drawings used in the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Technical solutions of the present disclosure will be described clearly and completely with reference to the accompanying drawings; obviously, implementations described are merely part of rather than all of implementations of the present disclosure. Based on the implementations of the present disclosure, other implementations obtained there from without any creative work by those of ordinary skill in the art shall fall into the protection scope of the present disclosure.

According to implementations of the present disclosure, there is provided a method for adjusting screen brightness and a user terminal, so as to adjust the screen brightness conveniently and quickly. The implementations of the present disclosure will be introduced respectively in detail below.

According to an implementation of the present disclosure, there is provided a method for adjusting screen brightness of the implementations, in which a user terminal detects a target pressure value and a target touch duration of a touch operation performed in a touch area by a user, then acquires a target brightness adjustment amount corresponding to the target touch duration according to a preset correspondence relationship between a touch duration and a brightness adjustment amount when a preset condition is met, thereafter, the user terminal can adjust screen brightness based on the target brightness adjustment amount. The method for adjusting the screen brightness provided in the implementations of the present disclosure will be described in detail with reference to FIG. 1 to FIG. 4.

Figure 1:
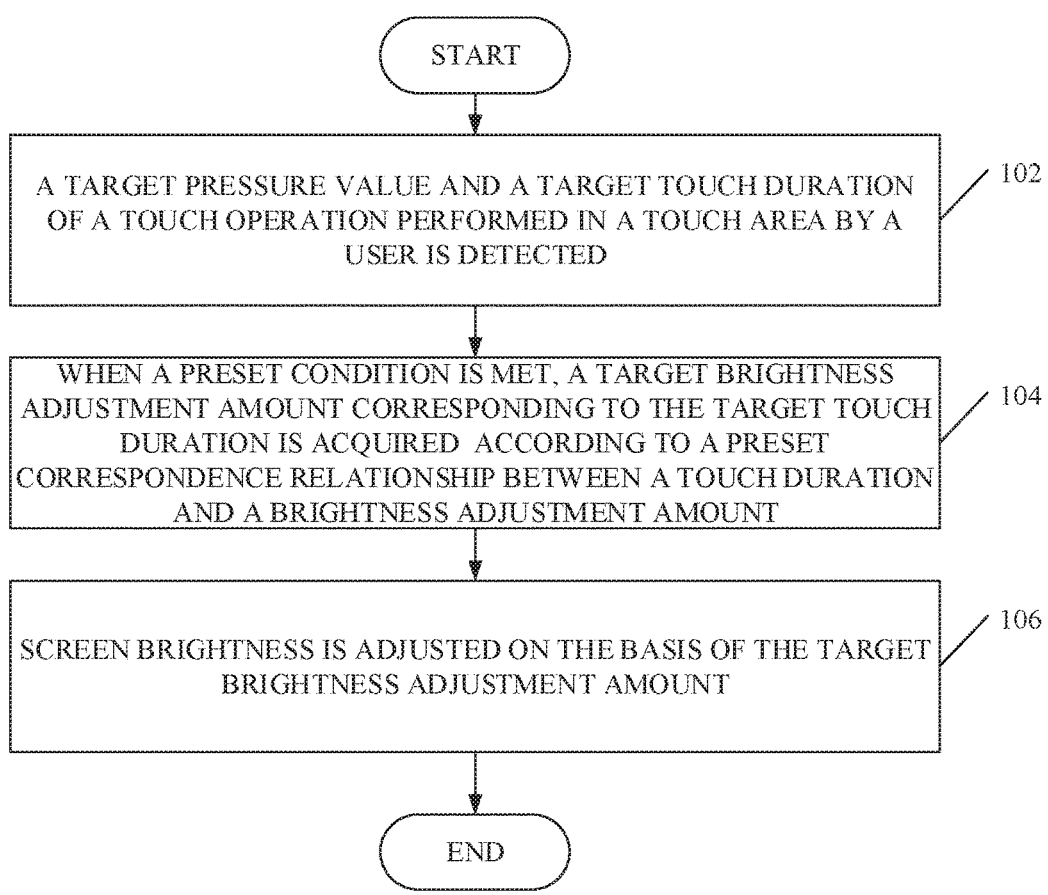
FIG. 1 is a schematic flow diagram illustrating a method for adjusting screen brightness of a first method implementation of the present disclosure.

Referring to FIG. 1, FIG. 1 is a schematic flow diagram illustrating a method for adjusting screen brightness of a first method implementation of the present disclosure. As illustrated in FIG. 1, the method for adjusting screen brightness can begin at block 102.

At block 102, a target pressure value and a target touch duration of a touch operation performed in a touch area by a user is detected.

In the implementation of the present disclosure, the target pressure value and the target touch duration of the touch operation performed in the touch area by the user is detected by a user terminal. The user terminal can include but not limited to intelligent phones, PDA, laptops, desktop computers, and other user terminals with a pressure detecting function. The operating system of the user terminal can include but not limited to an Android operating system, an IOS operating system, a Symbian operating system, a Black Berry operating system, a Windows Phone 8 operating system and the like, and the present disclosure is not limited thereto.

In the implementation of the present disclosure, when the user wants to adjust the screen brightness, the user can perform the touch operation in the touch area of a touch screen. When the user terminal detects the touch operation performed in the touch area by the user, the user terminal detects the target pressure value and the target touch duration of the touch operation performed by the user.

At block 104, when a preset condition is met, a target brightness adjustment amount corresponding to the target touch duration is acquired according to a preset correspondence relationship between a touch duration and a brightness adjustment amount.

Preset Condition 1

In this implementation, the preset condition 1 is that the target pressure value is greater than a preset pressure threshold.

After the user terminal detects the target pressure value of the touch operation performed in the touch area by the user, the user terminal can further judge whether or not the preset condition is met. In this implementation, the preset condition is that the target pressure value is greater than a preset pressure threshold, in other words, the user terminal judges whether or not the target pressure value is greater than the preset pressure threshold.

When the user terminal judges that the preset condition is met, in other words, when the user terminal judges that the target pressure value is greater than the preset pressure threshold, conduct the operation at block 104. When the user terminal judges the preset condition is not met, in other words, when the user terminal judges that the target pressure value is smaller than the preset pressure threshold, the process ends, or the user terminal continues to detect whether or not a pressure value of the touch operation performed by the current user is greater than the preset pressure threshold, until the finger of the user leaves the touch area (that is, the touch operation is finished).

In the implementation of the present disclosure, the user terminal may preset the correspondence relationship between the touch duration and the brightness adjustment amount. The brightness adjustment amount can be a brightness increase amount or a brightness reduction amount, and the present disclosure is not limited thereto. For example, it can be set in advance that, a brightness increase amount of 10 Candelas per square meter corresponds to a touch duration of 2 s, a brightness increase amount of 15 Candelas per square meter corresponds to a touch duration of 3 s.

In the implementation of the present disclosure, when the user terminal judges that the target pressure value is greater than the preset pressure threshold, the user terminal acquires the target brightness adjustment amount corresponding to the target touch duration according to the preset correspondence relationship between the touch duration and the brightness adjustment amount. Specifically, the user terminal can acquire the target brightness increase amount corresponding to the target touch duration according to a preset correspondence relationship between a touch duration and a brightness increase amount, or the user terminal can acquire the target brightness reduction amount corresponding to the target touch duration according to a preset correspondence relationship between a touch duration and a brightness reduction amount.

At block 106, screen brightness is adjusted based on the target brightness adjustment amount.

In the implementation of the present disclosure, after the user terminal acquires the target brightness adjustment amount, the user terminal can adjust the screen brightness based on the target brightness adjustment amount. Specifically, when the target brightness adjustment amount is the target brightness increase amount, the user terminal can increase the screen brightness based on the target brightness increase amount; when the target brightness adjustment amount is the target brightness reduction amount, the user terminal can decrease the screen brightness based on the target brightness reduction amount.

Operations of block 102~block 106 can be repeated for multiple times according to actual needs and/or application scenarios.

As can be seen from the implementations described above, the user terminal detects the target pressure value and the target touch duration of the touch operation performed in a touch area by a user; when a preset condition is met, the user terminal can acquire a target brightness adjustment amount corresponding to the target touch duration according to a preset correspondence relationship between a touch duration and a brightness adjustment amount, and adjust the screen brightness based on the target brightness adjustment amount. As can be seen, by means of the implementations of the present disclosure, the user only needs to perform the touch operation in the touch area to adjust the screen brightness; this can avoid the user to adjust the screen brightness via a complex operating procedure, and can improve the convenience of adjusting the screen brightness.

As can be seen from the method for adjusting the screen brightness illustrated in FIG. 1, the target brightness adjustment amount can be the target brightness increase amount or the target brightness reduction amount. The user terminal can acquire the target brightness increase amount and increase the screen brightness based on the target brightness increase amount, or acquire the target brightness reduction amount and decrease the screen brightness based on the target brightness reduction amount. Specifically, there can be a plurality of manners in which the user terminal acquires the target brightness adjustment amount, which will be described in detail with reference to FIG. 2 and FIG. 3.

Figure 2:
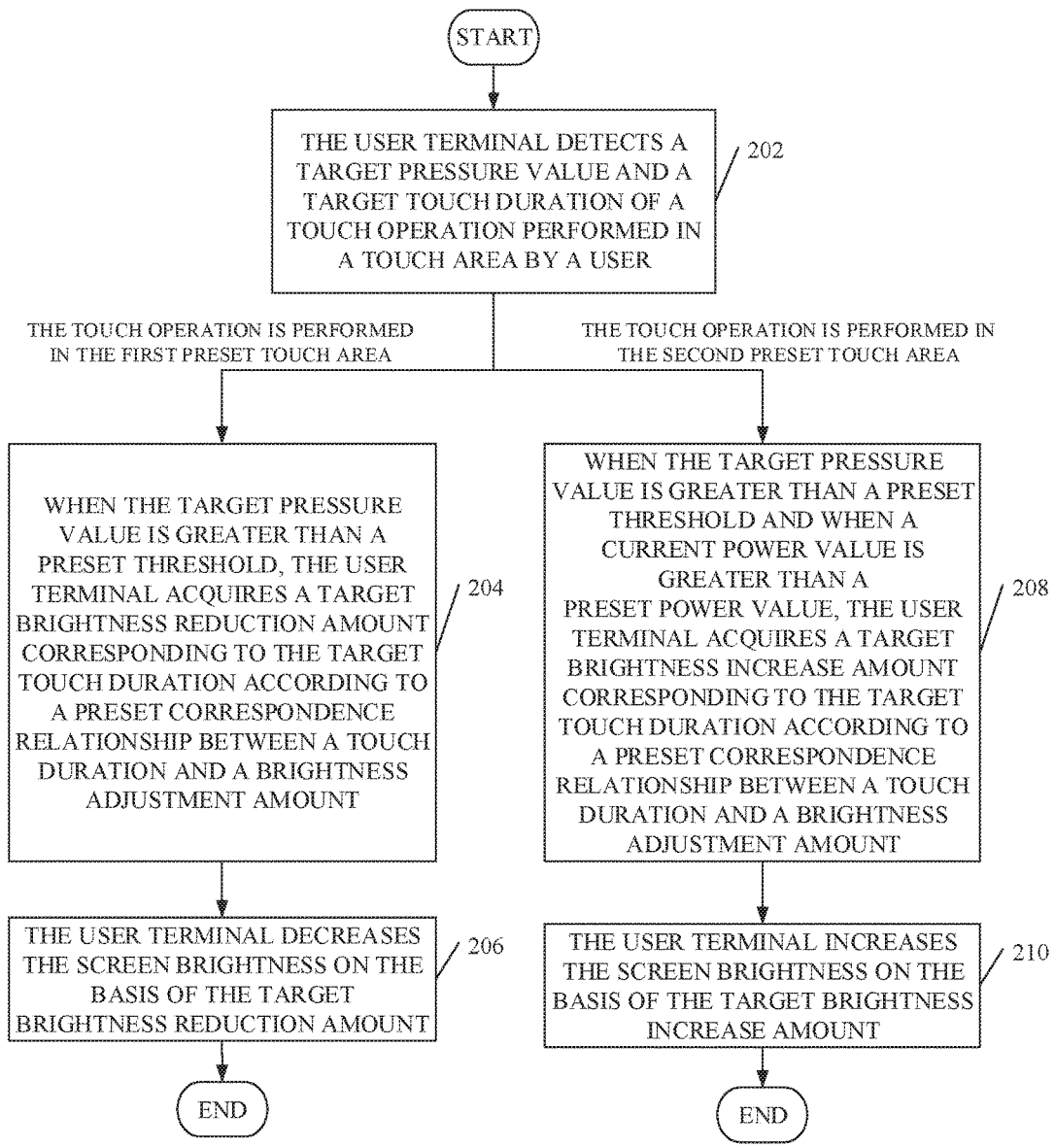
FIG. 2 is a schematic flow diagram illustrating another method for adjusting screen brightness of a second method implementation of the present disclosure.

Referring to FIG. 2, FIG. 2 is a schematic flow diagram illustrating another method for adjusting screen brightness of a second method implementation of the present disclosure. The method of FIG. 2 describes the implementation of a target brightness adjustment amount acquiring operation in detail based on FIG. 1. As illustrated in FIG. 2, the method for adjusting screen brightness can begin at block 202.

At block 202, the user terminal detects a target pressure value and a target touch duration of a touch operation performed in a touch area by a user.

Touch Area

In the implementation of the present disclosure, the touch area includes a first preset touch area and a second preset touch area, and the first preset touch area and the second preset touch area are two areas that do not coincide.

In some possible implementations, the first preset touch area and the second preset touch area can be set when the user terminal is shipped from a factory. For example, the first preset touch area can be the upper half of a touch screen of the user terminal, and the second preset touch area can be the lower half of the touch screen of the user terminal, and vice versa; the present disclosure is not limited thereto.

In some possible implementations, the first preset touch area and the second preset touch area can also be set manually by the user the user terminal.

In some possible implementations, the first preset touch area and the second preset touch area can also be set by the user terminal based on user habits. For example, the first preset touch area and the second preset touch area can be two different areas where the touch operation has been performed frequently in the past the use prefers to performing the touch operation, and the present disclosure is not limited thereto.

During implementation, the process that the user terminal detects the target pressure value and the target touch duration of the touch operation can refer to the description of block 102 of the first implementation and it will not be repeated here.

At block 204, when the target pressure value is greater than the preset pressure threshold and when the touch operation is performed in the first preset touch area, the user terminal acquires a target brightness reduction amount corresponding to the target touch duration according to a preset correspondence relationship between a touch duration and a brightness adjustment amount.

In the implementation of the present disclosure, after the user terminal detects the target pressure value of the touch operation performed in the touch area by the user, the user terminal can further judge whether or not a preset condition is met.

Preset Condition 2

With regard to a touch operation performed in the first preset touch area, the exemplary preset condition, that is, the preset condition 2 is that, the target pressure value is greater than a preset pressure threshold.

In the implementation of the present disclosure, when the touch operation is performed in the first preset touch area and when the user terminal judges that the target pressure value is greater than the preset pressure threshold, proceeds to the block 204. When the user terminal judges that the target pressure value is smaller than the preset pressure threshold, the process ends, or the user terminal may continue to detect whether or not a pressure value of the touch operation performed by the current user is greater than the preset pressure threshold, until the user leaves his or her finger from the touch area (that is, the touch operation is finished).

In the implementation of the present disclosure, when the touch operation is a touch operation performed in the first preset touch area and when the user terminal judges that the target pressure value is greater than the preset pressure threshold, the user terminal acquires the target brightness reduction amount corresponding to the target touch duration according to a preset correspondence relationship between a touch duration and a brightness reduction amount. After the user terminal acquires the target brightness reduction amount, proceeds to block 206.

At block 206, the user terminal decreases the screen brightness based on the target brightness reduction amount.

In the implementation of the present disclosure, after the user terminal acquires the target brightness reduction amount, the user terminal decreases the screen brightness based on the target brightness reduction amount.

At block 208, when the target pressure value is greater than the preset pressure threshold and the touch operation is performed in the first preset touch area, and when a current power value is greater than a preset power value, the user terminal acquires a target brightness increase amount corresponding to the target touch duration according to a preset correspondence relationship between a touch duration and a brightness adjustment amount.

Preset Condition 3

With regard to a touch operation performed in the second preset touch area, the exemplary preset condition, that is, the preset condition 3 is that, the target pressure value is greater than a preset pressure threshold and the current power value of the terminal is greater than the preset power value.

When the touch operation is performed in the second preset touch area and when the user terminal judges that the target pressure value is greater than the preset pressure threshold, the user terminal can further detect whether or not a current power value is greater than a preset power value. When the user terminal judges that the target pressure value is smaller than the preset pressure threshold, the process ends, or the user terminal may continue to detect whether or not a pressure value of the touch operation performed by the current user is greater than the preset pressure threshold, until the user leaves his or her finger from the touch area (that is, the touch operation is finished).

In the implementation of the present disclosure, when the user terminal judges that the current power value is greater than the preset power value, proceeds to the block 208; when the user terminal judges that the current power value is not greater than the preset power value, the process ends, or outputs inquiring information to inquire whether to continue to increase the screen brightness because the current power is too low.

In the implementation of the present disclosure, when the user wants to increase the screen brightness, the user terminal detects whether or not the current power value is a low power. When the current power value is not the low power, the user terminal increases the screen brightness, this helps to extend standby time and improve user experience.

In the implementation of the present disclosure, when the touch operation is a touch operation performed in the second preset touch area and when the user terminal judges that the current power value is greater than the preset power value, the user terminal acquires the target brightness increase amount corresponding to the target touch duration according to a preset correspondence relationship between a touch duration and a brightness increase amount. After the user terminal acquires the target brightness increase amount, proceeds to block 210.

At block 210, the user terminal increases the screen brightness based on the target brightness increase amount.

In the implementation of the present disclosure, after the user terminal acquires the target brightness increase amount, the user terminal increases the screen brightness based on the target brightness increase amount.

As can be seen from the implementations described above, when the user performs the touch operation in the touch area, the screen brightness can be increased; when the user performs the touch operation in another touch area, the screen brightness can be decreased. As can be seen, by means of the implementation of the present disclosure, the screen brightness can be adjusted conveniently.

Figure 3:
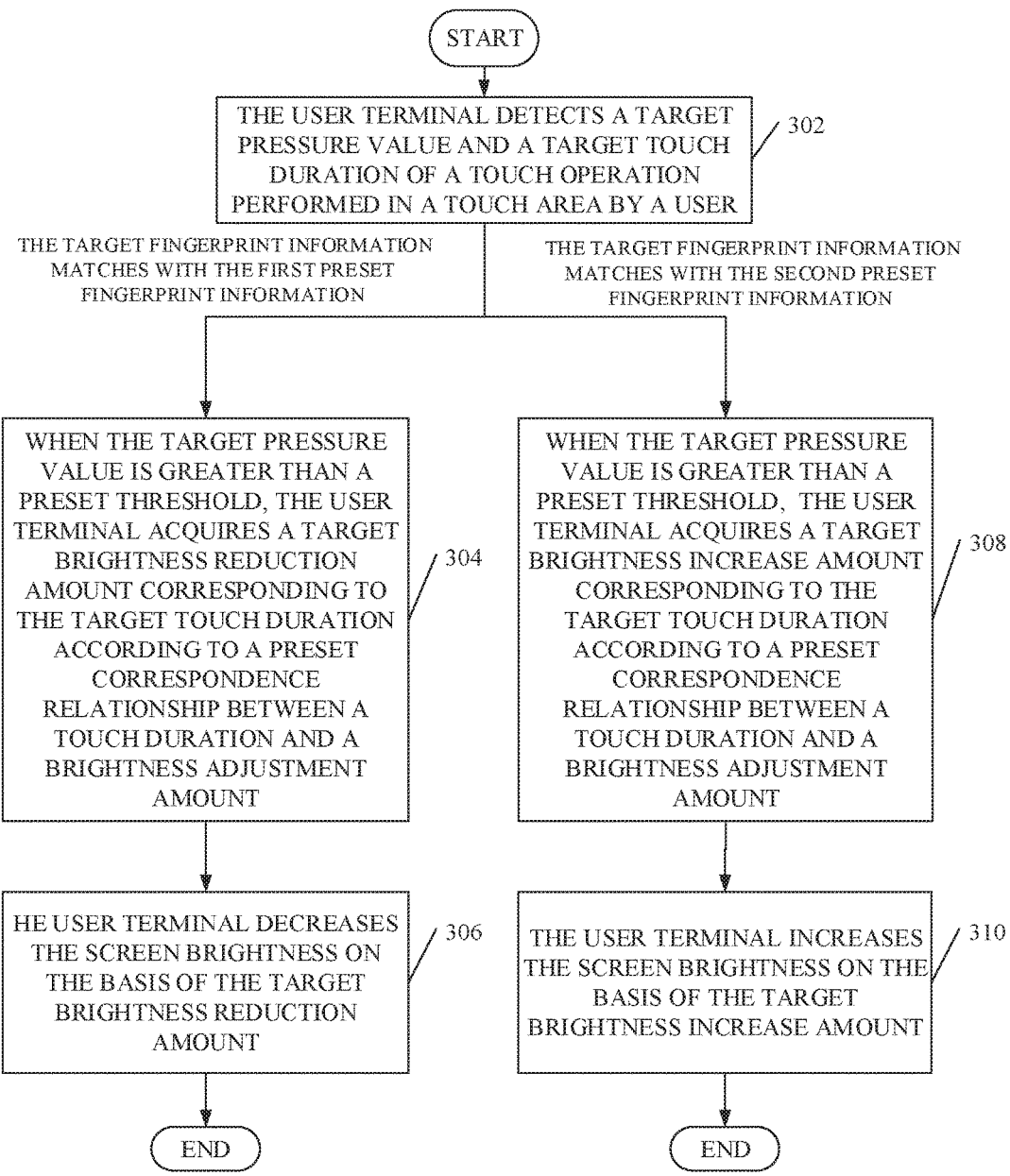
FIG. 3 is a schematic flow diagram illustrating another method for adjusting screen brightness of a third method implementation of the present disclosure.

In addition to the method of FIG. 2, FIG. 3 provides another implementation for the target brightness adjustment amount acquiring operation of the method for adjusting screen brightness. In FIG. 2, the target brightness adjustment amount acquiring operation is performed based on different preset touch areas; in FIG. 3, the target brightness adjustment amount acquiring operation will be performed based on different preset fingerprint information.

Referring to FIG. 3, FIG. 3 is a schematic flow diagram illustrating another method for adjusting screen brightness of a third method implementation of the present disclosure. As illustrated in FIG. 3, the method for adjusting screen brightness can begin at block 302.

At block 302, the user terminal detects a target pressure value and a target touch duration of a touch operation performed in a touch area by a user.

During implementation, the process that the user terminal detects the target pressure value and the target touch duration of the touch operation can refer to the description of block 102 of the first implementation and it will not be repeated here.

In this implementation, after the user terminal detects the target pressure value of the touch operation performed in the touch area by the user, the user terminal can further judge whether or not a preset condition is met.

Preset Condition 4

In this implementation, the preset condition 4 is that the target pressure value is greater than a preset pressure threshold and target fingerprint information input by the touch operation matches with preset fingerprint information.

Based on this, the user terminal may judge whether or not the target pressure value is greater than the preset pressure threshold and whether or not the target fingerprint information input by the touch operation matches with the preset fingerprint information.

In some possible implementations, when the user terminal judges that the target pressure value is greater than the preset pressure threshold, the user terminal further judges whether or not the target fingerprint information input by the touch operation matches with preset fingerprint information.

Alternatively, the user terminal may first judge whether the target fingerprint information input by the touch operation matches with the preset fingerprint information and then judge whether or not the target pressure value is greater than the preset pressure threshold.

When the user terminal judges that the target pressure value is smaller than the preset pressure threshold, the process ends, or the user terminal continues to detect whether or not a pressure value of the touch operation performed by the current user is greater than the preset pressure threshold, until the user leaves his or her finger from the touch area (that is, the touch operation is finished).

When the user terminal judges that the target fingerprint information input by the touch operation does not match with the preset fingerprint information, the process ends, or the user terminal continues to detect whether or not fingerprint information input by the touch operation performed by the current user matches with the preset fingerprint information, until the user leaves his or her finger from the touch area (that is, the touch operation is finished).

In the implementation of the present disclosure, the preset fingerprint information includes first preset fingerprint information and second preset fingerprint information, and the first preset fingerprint information is different from the second preset fingerprint information.

In some possible implementations, the first preset fingerprint information and the second preset fingerprint information can be pre-stored in a memory of the user terminal by the user in advance. For example, the first preset fingerprint information can be fingerprint information of the thumb of the user, the second preset fingerprint information can be fingerprint information of the index finger of the user, and the present disclosure is not limited thereto.

When the user terminal judges that the target pressure value is greater than the preset pressure threshold, the user terminal further judges whether or not the target fingerprint information input by the touch operation matches with the first preset fingerprint information. When the target fingerprint information matches with the first preset fingerprint information, proceed to block 304. Alternatively, when the target fingerprint information does not match with the first preset fingerprint information, the user terminal judges whether or not the target fingerprint information matches with the second preset fingerprint information. When the target fingerprint information matches with the second preset fingerprint information, proceed to block 308; when the target fingerprint information does not match with the second preset fingerprint information, the process ends.

As another implementation, when the user terminal judges that the target pressure value is greater than the preset pressure threshold, the user terminal can first judge whether or not the target fingerprint information matches with the second preset fingerprint information. When the target fingerprint information matches with the second preset fingerprint information, proceed to block 308. Alternatively, when the target fingerprint information does not match with the second preset fingerprint information, the user terminal judges whether or not the target fingerprint information matches with the first preset fingerprint information. When the target fingerprint information matches with the first preset fingerprint information, proceed to block 304; when the target fingerprint information does not match with the first preset fingerprint information, the process ends.

In the implementation of the present disclosure, when the target fingerprint information matches with the second preset fingerprint information and when the user terminal judges that the target pressure value is greater than the preset pressure threshold, the user terminal can further detect whether or not a current power value is greater than a preset power value. When the user terminal judges that the current power value is greater than the preset power value, proceeds to block 308.

At block 304, when the target pressure value is greater than the preset pressure threshold and the target fingerprint information matches with the first preset fingerprint information, the user terminal acquires a target brightness reduction amount corresponding to the target touch duration according to a preset correspondence relationship between a touch duration and a brightness adjustment amount.

In the implementation of the present disclosure, when the user terminal judges that the target fingerprint information matches with the first preset fingerprint information, the user terminal acquires the target brightness reduction amount corresponding to the target touch duration according to the preset correspondence relationship between the touch duration and the brightness reduction amount. After the user terminal acquires the target brightness reduction amount, proceeds to block 306.

At block 306, the user terminal decreases the screen brightness based on the target brightness reduction amount.

In the implementation of the present disclosure, after the user terminal acquires the target brightness reduction amount, the user terminal can decrease the screen brightness based on the target brightness reduction amount.

At block 308, when the target pressure value is greater than the preset pressure threshold and the target fingerprint information matches with the second preset fingerprint information, the user terminal acquires a target brightness increase amount corresponding to the target touch duration according to a preset correspondence relationship between a touch duration and a brightness adjustment amount.

In the implementation of the present disclosure, when the user terminal judges that the target fingerprint information matches with the second preset fingerprint information, the user terminal acquires the target brightness increase amount corresponding to the target touch duration according to a preset correspondence relationship between a touch duration and a brightness increase amount. After the user terminal acquires the target brightness increase amount, proceeds to block 310.

At block 310, the user terminal increases the screen brightness based on the target brightness increase amount.

In the implementation of the present disclosure, after the user terminal acquires the target brightness increase amount, the user terminal can increase the screen brightness based on the target brightness increase amount.

As can be seen from the implementations described above, when a user performs a touch operation using a finger, screen brightness can be increased; when the user performs the touch operation using another finger, the screen brightness can be decreased. As can be seen, by means of the implementation of the present disclosure, the screen brightness can be adjusted conveniently.

FIG. 1 to FIG. 3 illustrates the implementation of screen brightness adjusting operation. After the screen brightness is increased, the user terminal can further output screen brightness excessive alarms when the user terminal detects that a current screen brightness value is greater than a preset brightness threshold so as to protect the eyes of the user, which will be described in detail with reference to FIG. 4.

Figure 4:
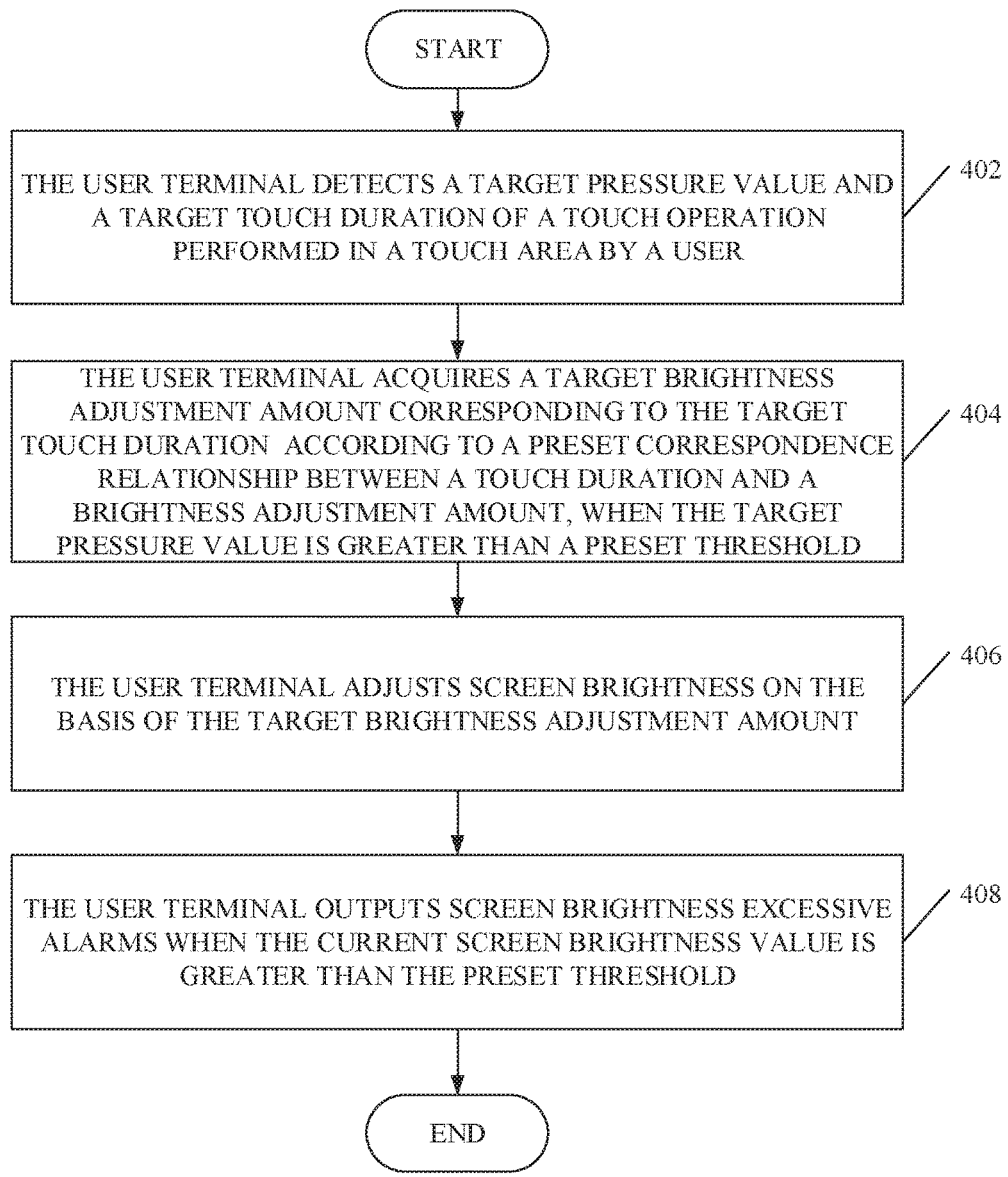
FIG. 4 is a schematic flow diagram illustrating another method for adjusting screen brightness of a fourth method implementation of the present disclosure.

Referring to FIG. 4, FIG. 4 is a schematic flow diagram illustrating another method for adjusting screen brightness of a fourth method implementation of the present disclosure. As illustrated in FIG. 4, the method for adjusting screen brightness can begin at block 402.

At block 402, the user terminal detects a target pressure value and a target touch duration of a touch operation performed in a touch area by a user.

During implementation, the process that the user terminal detects the target pressure value and the target touch duration of the touch operation can refer to the description of block 102 of the first implementation and it will not be repeated here.

At block 404, when the target pressure value is greater than the preset pressure threshold, the user terminal acquires a target brightness adjustment amount corresponding to the target touch duration according to a preset correspondence relationship between a touch duration and a brightness adjustment amount.

In the implementation of the present disclosure, after the user terminal detects the target pressure value of the touch operation performed in the touch area by the user, the user terminal will judge whether or not a preset condition is met. In this implementation, the preset condition can be that the target pressure value is greater than a preset pressure threshold. The user terminal can judge whether or not the target pressure value is greater than the preset pressure threshold. When the user terminal judges that the target pressure value is greater than the preset pressure threshold, proceeds to the block 404. When the user terminal judges that the target pressure value is smaller than the preset pressure threshold, the process ends, or the user terminal continues to detect whether or not a pressure value of the touch operation performed by the current user is greater than the preset pressure threshold, until the user leaves his or her finger from the touch area (that is the touch operation is finished).

At block 406, the user terminal adjusts screen brightness based on the target brightness adjustment amount.

In the implementation of the present disclosure, after the user terminal adjusts the screen brightness based on the target brightness adjustment amount, the user terminal will detect whether or not a current screen brightness value is greater than a preset brightness threshold. When the user terminal detects that the current screen brightness value is greater than the preset brightness threshold, proceeds to block 408; when the user terminal detects that the current screen brightness value is smaller than the preset brightness threshold, the process ends.

At block 408, when the current screen brightness value is greater than the preset brightness threshold, the user terminal outputs screen brightness excessive alarms.

In the implementation of the present disclosure, the user terminal can output screen brightness excessive alarms in the form of voice or text, the present disclosure is not limited thereto.

In practice, excessive screen brightness will cause damage to the eyes of the user. In the implementation of the present disclosure, when the user adjusts the screen brightness to excessive brightness, alarms are output to the user, so that the user can take measures to protect the eyes, thus improving user experience.

Figure 5:
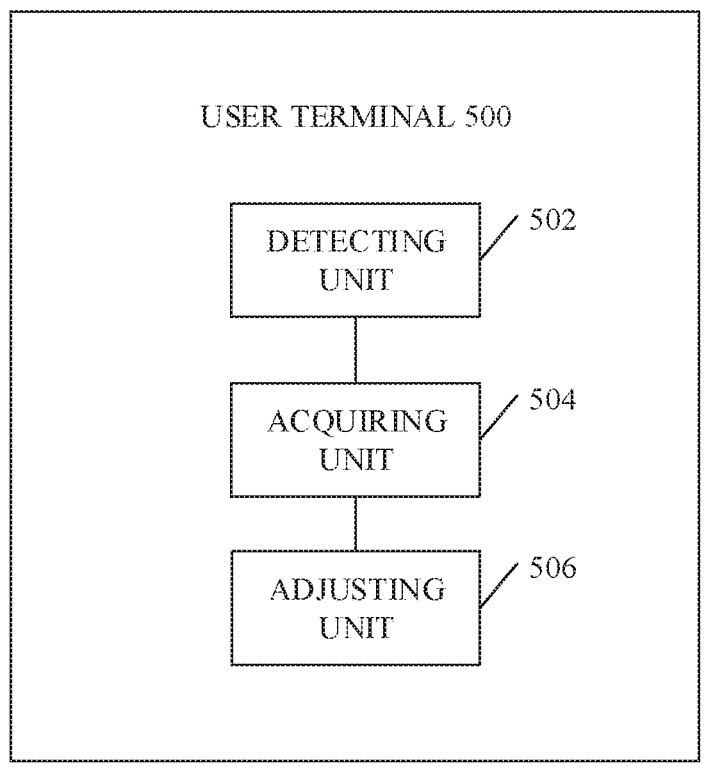
FIG. 5 is a structural schematic diagram illustrating a user terminal of a first apparatus implementation of the present disclosure.

Referring to FIG. 5, FIG. 5 is a structural schematic diagram illustrating a user terminal of a first apparatus implementation of the present disclosure. The user terminal 500 illustrated in FIG. 5 can include a detecting unit 502 (such as a detector or a sensor), an acquiring unit 504 (such as a processor), and an adjusting unit 506 (such as a logic circuit). As one implementation, the detecting unit 502, the acquiring unit 504 and the adjusting unit 506 can be integrated into one element per actual needs.

The detecting unit 502 is configured to detect a target pressure value and a target touch duration of a touch operation performed in a touch area by a user.

In the implementation of the present disclosure, the target pressure value and the target touch duration of the touch operation performed in the touch area by the user is detected by the detecting unit 502 of the user terminal 500. The user terminal 500 can include but not limited to smart phones, PDA, laptops, desktop computers, and other user terminals with a pressure detecting function. The operating system of the user terminal 500 can include but not limited to an Android operating system, an IOS operating system, a Symbian operating system, a Black Berry operating system, a Windows Phone 8 operating system and the like, and the present disclosure is not limited thereto.

In the implementation of the present disclosure, when the user wants to adjust the screen brightness, the user can perform the touch operation in the touch area of a touch screen. When the detecting unit 502 detects the touch operation performed in the touch area by the user, the detecting unit 502 detects the target pressure value and the target touch duration of the touch operation performed by the user.

The acquiring unit 504 is configured to acquire a target brightness adjustment amount corresponding to the target touch duration according to a preset correspondence relationship between a touch duration and a brightness adjustment amount, when a preset condition is met.

In some possible implementations, the preset condition can include that the target pressure value is greater than a preset pressure threshold.

In the implementation of the present disclosure, the user terminal 500 may preset the correspondence relationship between the touch duration and the brightness adjustment amount. The brightness adjustment amount can be a brightness increase amount or a brightness reduction amount, and the present disclosure is not limited thereto. For example, it can be set in advance that, a brightness increase amount of 10 Candelas per square meter corresponds to a touch duration of 2 s, a brightness increase amount of 15 Candelas per square meter corresponds to a touch duration of 3 s.

In the implementation of the present disclosure, when the target pressure value is greater than the preset pressure threshold, the acquiring unit 504 acquires the target brightness adjustment amount corresponding to the target touch duration according to the preset correspondence relationship between the touch duration and the brightness adjustment amount. Specifically, the acquiring unit 504 can acquire the target brightness increase amount corresponding to the target touch duration according to a preset correspondence relationship between a touch duration and a brightness increase amount, or the acquiring unit 504 can acquire the target brightness reduction amount corresponding to the target touch duration according to a preset correspondence relationship between a touch duration and a brightness reduction amount.

The adjusting unit 506 is configured to adjust screen brightness based on the target brightness adjustment amount.

In the implementation of the present disclosure, after the acquiring unit 504 acquires the target brightness adjustment amount, the adjusting unit 506 can adjust the screen brightness based on the target brightness adjustment amount. Specifically, when the target brightness adjustment amount is the target brightness increase amount, the adjusting unit 506 can increase the screen brightness based on the target brightness increase amount; when the target brightness adjustment amount is the target brightness reduction amount, the adjusting unit 506 can decrease the screen brightness based on the target brightness reduction amount.

In some possible implementations, the touch area includes a first preset touch area and a second preset touch area, and the first preset touch area and the second preset touch area are two areas that do not coincide.

When the touch operation is performed in the first preset touch area, the target brightness adjustment amount is a target brightness reduction amount, and the adjusting unit 506 is further configured to decrease the screen brightness based on the target brightness reduction amount.

When the touch operation is performed in the second preset touch area, the target brightness adjustment amount is a target brightness increase amount, and the adjusting unit 506 is further configured to increase the screen brightness based on the target brightness increase amount.

The preset condition can further include a current power value is greater than a preset power value in addition to that the target pressure value is greater than the preset pressure threshold, when the touch operation is performed in the second preset touch area.

By means of the implementation of the present disclosure, when the user performs the touch operation in a touch area, the screen brightness can be increased; when the user performs the touch operation in another touch area, the screen brightness can be decreased. As can be seen, by means of the implementation of the present disclosure, the screen brightness can be adjusted conveniently.

The preset condition can further include target fingerprint information input by the touch operation matches with preset fingerprint information in addition to that the target pressure value is greater than the preset pressure threshold.

As an optional implementation, the preset fingerprint information includes first preset fingerprint information and second preset fingerprint information, and the first preset fingerprint information is different from the second preset fingerprint information. When the target fingerprint information matches with the first preset fingerprint information, the target brightness adjustment amount is a target brightness reduction amount, and the adjusting unit 506 is configured to decrease the screen brightness based on the target brightness reduction amount.

When the target fingerprint information matches with the second preset fingerprint information, the target brightness adjustment amount is a target brightness increase amount, and the adjusting unit 506 is configured to increase the screen brightness based on the target brightness increase amount.

By means of the implementation of the present disclosure, when the user performs the touch operation using a finger, the screen brightness can be increased; when the user performs the touch operation using another finger, the screen brightness can be decreased. As can be seen, by means of the implementation of the present disclosure, the screen brightness can be adjusted conveniently.

Figure 6:
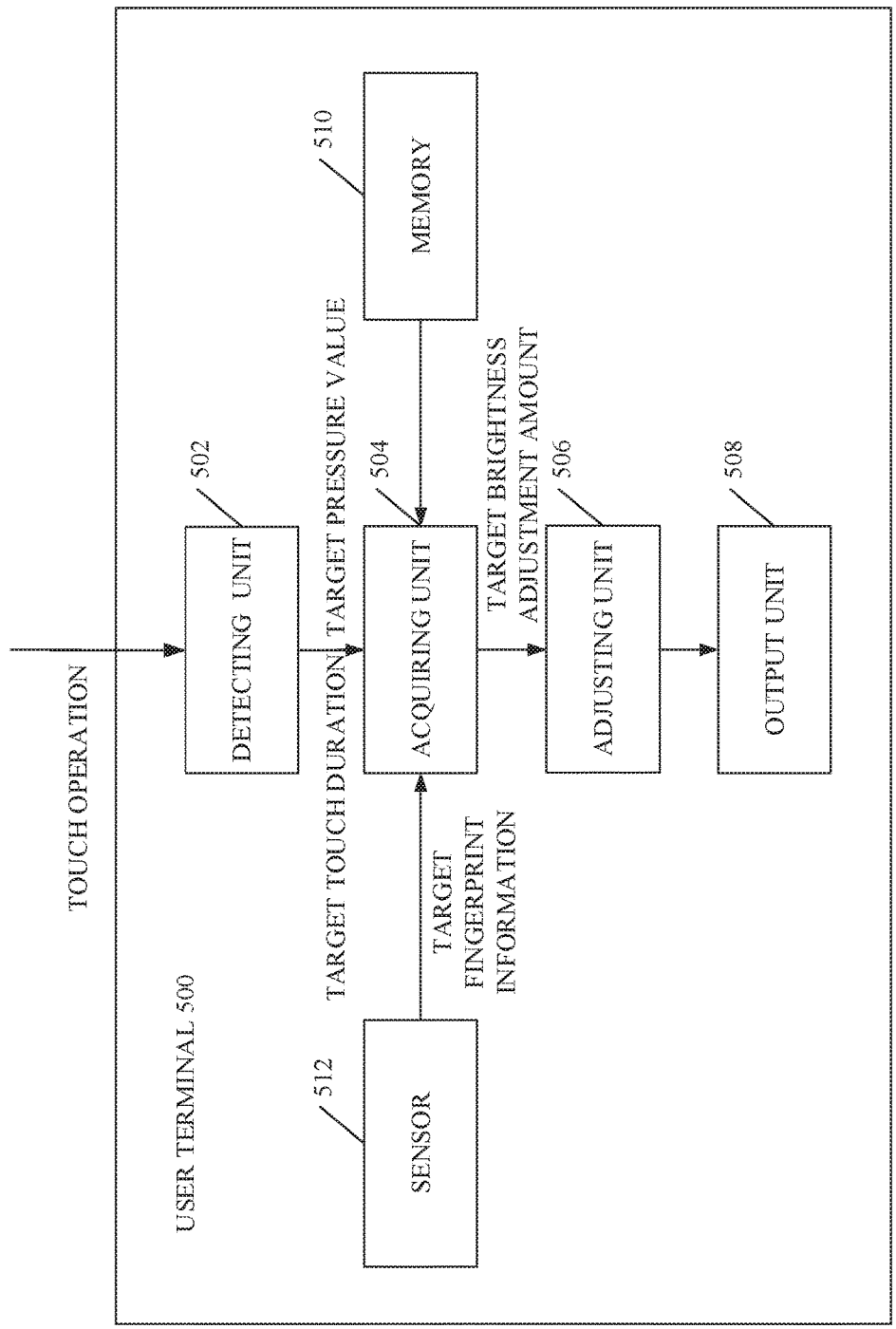
FIG. 6 is a structural schematic diagram illustrating another user terminal of a second apparatus implementation of the present disclosure.

Referring to FIG. 6 together, FIG. 6 is a structural schematic diagram illustrating another user terminal of a second apparatus implementation of the present disclosure. The user terminal 500 illustrated in FIG. 6 is optimized according to the user terminal illustrated in FIG. 5. Compared with the user terminal illustrated in FIG. 5, the user terminal 500 illustrated in FIG. 6 can further include an output unit 508 (such as a screen or a loudspeaker) in addition to all units of the user terminal illustrated in FIG. 5. The detecting unit 502, the acquiring unit 504, and the adjusting unit 506 have been described with reference to FIG. 5 and will not be repeated here. The preset pressure threshold, the preset correspondence relationship between the touch duration and the brightness adjustment amount, the preset power value and the preset brightness value can be stored in a memory 510 as illustrated in FIG. 6. The target fingerprint information input by the touch operation can be acquired by a sensor 512 as illustrated in FIG. 6.

The output unit 508 is configured to output screen brightness excessive alarms when a current screen brightness value is greater than a preset brightness threshold.

In the implementation of the present disclosure, the output unit 508 can output screen brightness excessive alarms in the form of voice or text, the present disclosure is not limited thereto.

In practice, excessive screen brightness will cause damage to the eyes of the user. In the implementation of the present disclosure, when the user adjusts the screen brightness to excessive brightness, alarms are output to the user, so that the user can take measures to protect the eyes, thus improving the user experience.

In the user terminal illustrated in from FIG. 5 to FIG. 6, the detecting unit detects the target pressure value and the target touch duration of the touch operation performed in the touch area by the user; after the detecting unit has detected the target pressure value and when a preset condition is met, the acquiring unit acquires the target brightness adjustment amount corresponding to the target touch duration according to the preset correspondence relationship between the touch duration and the brightness adjustment amount; the adjusting unit adjusts the screen brightness based on the target brightness adjustment amount. As can be seen, by means of the implementation of the present disclosure, the user only needs to perform the touch operation in the touch area to adjust the screen brightness; this can avoid the user to adjust the screen brightness via a complex operating procedure, and can improve the convenience of adjusting the screen brightness.

Figure 7:
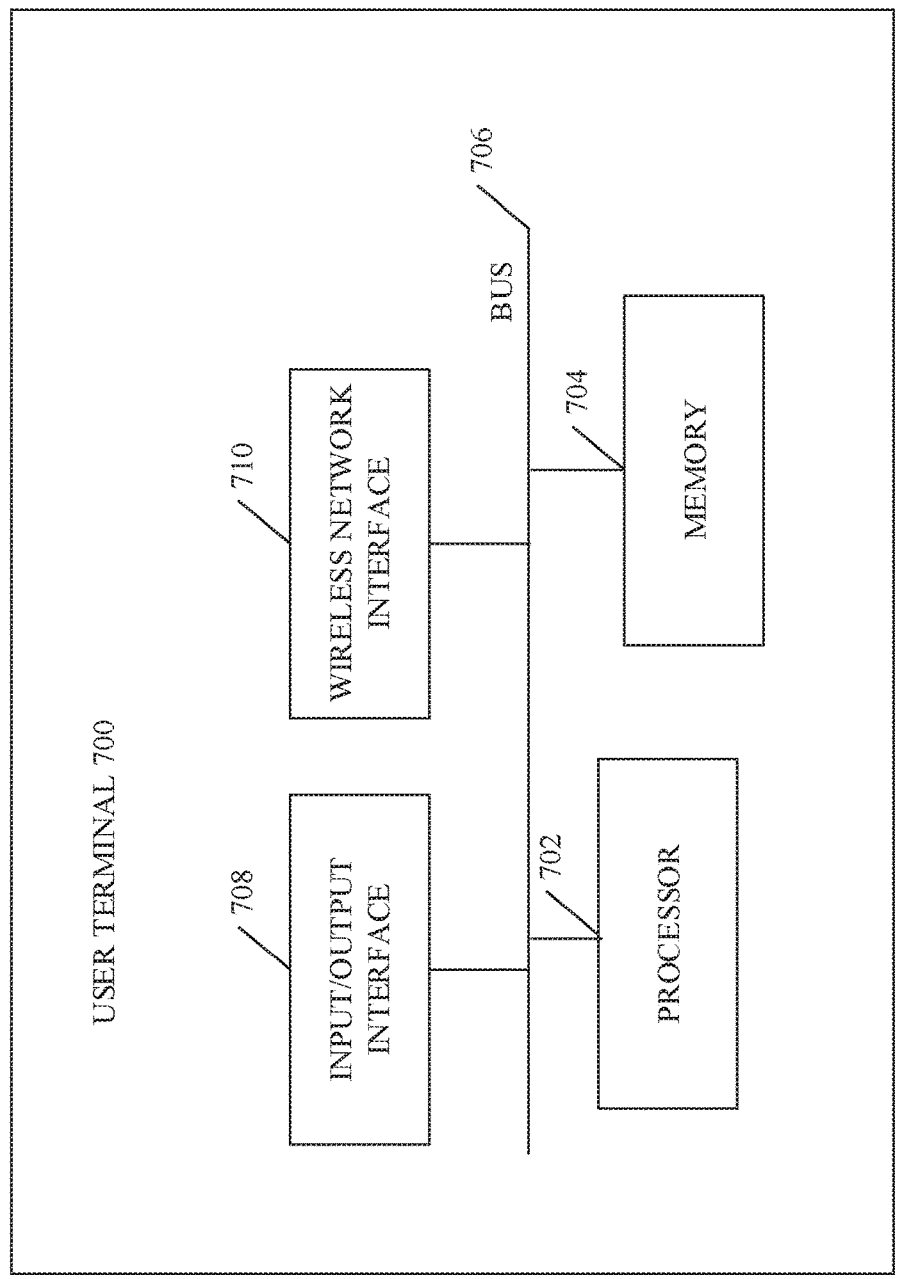
FIG. 7 is a structural schematic diagram illustrating another terminal of a third apparatus implementation of the present disclosure.

Referring to FIG. 7, FIG. 7 is a structural schematic diagram illustrating a user terminal of a third apparatus implementation of the present disclosure. The user terminal 700 includes a processor 702 and a memory 704 connected with the processor 702 via a BUS 706. The memory 704 is configured to store a set of program codes and the processor 702 is configured to call the program codes stored in the memory 704 to conduct the following operations. Besides, the user terminal can further includes an input/output interface 708 for communication with external equipment and a wireless network interface 710 for accessing a network. The processor 702, the memory 704, the input/output interface 708, and the wireless network interface 710 can be interconnected via a BUS 706.

The processor 702 detects a target pressure value and a target touch duration of a touch operation performed in a touch area by a user. When a preset condition is met, the processor 702 acquires a target brightness adjustment amount corresponding to the target touch duration according to a preset correspondence relationship between a touch duration and a brightness adjustment amount. The processor 702 adjusts screen brightness based on the target brightness adjustment amount.

In some possible implementations, the preset condition includes that the target pressure value is greater than a preset pressure threshold.

As an optional implementation, the touch area includes a first preset touch area and a second preset touch area, and the first preset touch area and the second preset touch area are two areas that do not coincide. When the touch operation is performed in the first preset touch area, the target brightness adjustment amount is a target brightness reduction amount, and the processor 702 configured to call the program codes stored in the memory 704 to adjust the screen brightness based on the target brightness adjustment amount is further configured to decrease the screen brightness based on the target brightness reduction amount.

When the touch operation is performed in the second preset touch area, the target brightness adjustment amount is a target brightness increase amount, and the processor 702 configured to call the program codes stored in the memory 704 to adjust the screen brightness based on the target brightness adjustment amount is further configured to increase the screen brightness based on the target brightness increase amount.

As an optional implementation, when the touch operation is performed in the second preset touch area, the preset condition can further include that a current power value is greater than a preset power value in addition to that the target pressure value is greater than a preset pressure threshold.

As an optional implementation, the preset condition can further include that target fingerprint information input by the touch operation matches with preset fingerprint information in addition to that the target pressure value is greater than a preset pressure threshold.

As an optional implementation, the preset fingerprint information includes first preset fingerprint information and second preset fingerprint information, and the first preset fingerprint information is different from the second preset fingerprint information. When the target fingerprint information matches with the first preset fingerprint information, the target brightness adjustment amount is a target brightness reduction amount, and the processor 702 configured to call the program codes stored in the memory 704 to adjust the screen brightness based on the target brightness adjustment amount is further configured to decrease the screen brightness based on the target brightness reduction amount.

When the target fingerprint information matches with the second preset fingerprint information, the target brightness adjustment amount is a target brightness increase amount, and the processor 702 configured to call the program codes stored in the memory 704 to adjust the screen brightness based on the target brightness adjustment amount is further configured to increase the screen brightness based on the target brightness increase amount.

As an optional implementation, the processor is configured to conduct the follows: after the processor 702 calls the program codes stored in the memory 704 to adjust the screen brightness based on the target brightness adjustment amount.

The processor 702 outputs screen brightness excessive alarms, when the current screen brightness value is greater than the preset brightness threshold.

What needs to be explained is, in the above-mentioned implementations, the descriptions of various implementations each have a focus, and portions not detailed in one implementation can refer to a relevant description of the other implementations. Then those skilled in the art should know that the implementations described herein are optimized implementations, actions and units/modules involved may not be necessary for the present disclosure.

The steps in the method of the implementation of the present disclosure can be sequentially adjusted, merged, and subtracted according to actual needs.

The units in the user terminal of the implementation of the present disclosure can be combined, divided, and deleted according to actual needs.

It will be understood by those of ordinary skill in the art that, implementation of all or part of the processes in the method of the implementations described above can be accomplished by a computer program to instruct the associated hardware; the computer program can be stored in a computer-readable storage medium. The storage medium can be a flash disk, a read-only memory (ROM), a random access memory (RAM), a magnetic disk, an optical disk, or the like.

While the method for adjusting screen brightness and the user terminal provided in the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for adjusting screen brightness, comprising:
   detecting a target pressure value and a target touch duration of a touch operation performed in a touch area by a user;
   acquiring a target brightness adjustment amount corresponding to the target touch duration according to a preset correspondence relationship between a touch duration and a brightness adjustment amount, when a preset condition is met, the preset condition comprising that the target pressure value is greater than a preset pressure threshold; and
   adjusting screen brightness based on the target brightness adjustment amount;
   wherein the touch area comprises a first preset touch area and a second preset touch area, the first preset touch area and the second preset touch area are two areas that do not coincide, and adjusting the screen brightness based on the target brightness adjustment amount comprises:
      decreasing the screen brightness based on a target brightness reduction amount when the touch operation is performed in the first preset touch area; and
      increasing the screen brightness based on a target brightness increase amount when the touch operation is performed in the second preset touch area;
   wherein the preset condition further comprises: target fingerprint information input by the touch operation matches with preset fingerprint information, the preset fingerprint information comprises first preset fingerprint information and second preset fingerprint information, the first preset fingerprint information is different from the second preset fingerprint information; and adjusting the screen brightness based on the target brightness adjustment amount comprises:

decreasing the screen brightness based on a target brightness reduction amount when the target fingerprint information matches with the first preset fingerprint information; and increasing the screen brightness based on a target brightness increase amount when the target fingerprint information matches with the second preset fingerprint information.

2. The method of claim 1, wherein when the touch operation is performed in the second preset touch area, the preset condition further comprises: a current power value is greater than a preset power value.

3. The method of claim 1, further comprising:
after adjusting the screen brightness based on the target brightness adjustment amount, outputting screen brightness excessive alarms when a current screen brightness value is greater than a preset brightness threshold.

4. A user terminal, comprising:
a processor and a memory connected with the processor, wherein the memory is configured to store program codes, and the processor is configured to call the program codes stored in the memory to:
detect a target pressure value and a target touch duration of a touch operation performed in a touch area by a user;
acquire a target brightness adjustment amount corresponding to the target touch duration according to a preset correspondence relationship between a touch duration and a brightness adjustment amount when a preset condition is met, the preset condition comprising that the target pressure value is greater than a preset pressure threshold; and
adjust screen brightness based on the target brightness adjustment amount;
wherein the touch area comprises a first preset touch area and a second preset touch area, the first preset touch area and the second preset touch area are two areas that do not coincide, and the processor configured to adjust the screen brightness based on the target brightness adjustment amount is further configured to: decrease the screen brightness based on a target brightness reduction amount when the touch operation is performed in the first preset touch area; and increase the screen brightness based on a target brightness increase amount when the touch operation is performed in the second preset touch area; and
wherein the preset condition further comprises: target fingerprint information input by the touch operation matches with preset fingerprint information, the preset fingerprint information comprises first preset fingerprint information and second preset fingerprint information, the first preset fingerprint information is different from the second preset fingerprint information; and the processor configured to adjust the screen brightness based on the target brightness adjustment amount is further configured to: decrease the screen brightness based on a target brightness reduction amount when the target fingerprint information matches with the first preset fingerprint information; and increase the screen brightness based on a target brightness increase amount when the target fingerprint information matches with the second preset fingerprint information.

5. The user terminal of claim 4, wherein when the touch operation is performed in the second preset touch area, the preset condition further comprises: a current power value is greater than a preset power value.

6. The user terminal of claim 4, wherein the processor is further configured to call the program codes stored in the memory to:
output screen brightness excessive alarms when a current screen brightness value is greater than a preset brightness threshold.

* * * * *